United States Patent
Inanc et al.

(10) Patent No.: US 8,853,618 B2
(45) Date of Patent: Oct. 7, 2014

(54) TIME DEPENDENT MEASUREMENT OF FORMATION PROPERTIES USING PULSED NEUTRON GENERATORS

(75) Inventors: Feyzi Inanc, Spring, TX (US); Margarete M. Kopal, Houston, TX (US); Loren P. Roberts, Humble, TX (US)

(73) Assignee: Baker Hughes Incorporated, Houston, TX (US)

( * ) Notice: Subject to any disclaimer, the term of this patent is extended or adjusted under 35 U.S.C. 154(b) by 113 days.

(21) Appl. No.: 13/014,383

(22) Filed: Jan. 26, 2011

(65) Prior Publication Data
US 2011/0180697 A1    Jul. 28, 2011

Related U.S. Application Data

(60) Provisional application No. 61/299,191, filed on Jan. 28, 2010.

(51) Int. Cl.
G01V 5/00 (2006.01)
G01V 5/04 (2006.01)
G01V 5/12 (2006.01)
G01V 5/10 (2006.01)

(52) U.S. Cl.
CPC *G01V 5/104* (2013.01); *G01V 5/04* (2013.01); *G01V 5/12* (2013.01)
USPC ........................................................ 250/265

(58) Field of Classification Search
USPC ........................................................ 250/265
See application file for complete search history.

(56) References Cited

U.S. PATENT DOCUMENTS

| | | | |
|---|---|---|---|
| 3,379,882 A * | 4/1968 | Youmans | 250/264 |
| 3,942,004 A | 3/1976 | Kehler | |
| 4,097,737 A * | 6/1978 | Mills, Jr. | 250/269.4 |
| 4,137,450 A | 1/1979 | Hopkinson | |
| 4,302,669 A * | 11/1981 | Allen et al. | 250/264 |
| 4,910,397 A * | 3/1990 | Mills et al. | 250/264 |
| 5,767,510 A | 6/1998 | Evans | |
| 5,777,323 A | 7/1998 | Hemingway | |
| 5,828,214 A | 10/1998 | Taicher et al. | |
| 5,900,627 A | 5/1999 | Odom et al. | |
| 6,376,838 B1 | 4/2002 | Odom | |
| 6,936,812 B2 | 8/2005 | Odom et al. | |
| 7,294,829 B2 | 11/2007 | Gilchrist | |
| 7,491,929 B2 | 2/2009 | Truax | |
| 7,791,017 B2 | 9/2010 | Stephenson et al. | |
| 7,897,914 B2 | 3/2011 | Hall et al. | |
| 7,902,496 B2 | 3/2011 | Botto et al. | |
| 2003/0009288 A1 | 1/2003 | Mickael | |
| 2006/0192096 A1 | 8/2006 | Radtke et al. | |
| 2010/0145621 A1 | 6/2010 | Moake | |

(Continued)

*Primary Examiner* — Christine Sung
(74) *Attorney, Agent, or Firm* — Mossman Kumar & Tyler PC

(57) ABSTRACT

An apparatus and method for estimating at least one parameter of interest of an earth formation including an estimation of the parameter of interest using a time-dependent ratio of information obtained from at least one neutron detector through the exposure of the earth formation to a radiation source, particularly a pulsed nuclear source. The apparatus includes a processor and storage subsystem with a program that, when executed, implements the method. Also, an apparatus and method for estimating at least one parameter of interest of an earth formation including an estimation of the parameter of interest using a first component and a second component of an information set obtained using a single radiation detector.

18 Claims, 14 Drawing Sheets

(56) References Cited

U.S. PATENT DOCUMENTS

| | | |
|---|---|---|
| 2010/0187412 A1 | 7/2010 | Grant et al. |
| 2010/0193676 A1 | 8/2010 | Jacobson et al. |
| 2010/0252724 A1 | 10/2010 | Inanc et al. |
| 2010/0332138 A1 | 12/2010 | Inanc et al. |
| 2011/0035151 A1 | 2/2011 | Botto |
| 2011/0049345 A1 | 3/2011 | Roberts |

* cited by examiner

Variation of Short-to-Long Space Detector Count Ratios with Time for Various Formation Types with Varying Water Saturated Porosity Levels Variation of $R_{max}$ Values with the Hydrogen Index Correlation Curves Showing how the Weighted Time-Averaged Ratios Behave as a Function of Porosity Values for Various Windows Sizes

TIME DEPENDENT MEASUREMENT OF FORMATION PROPERTIES USING PULSED NEUTRON GENERATORS

CROSS-REFERENCES TO RELATED APPLICATIONS

This application claims priority from U.S. Provisional Patent Application Ser. No. 61/299,191 filed on 28 Jan. 2010.

FIELD OF THE DISCLOSURE

In one aspect, this disclosure generally relates to borehole logging methods and apparatuses for estimating formation properties using nuclear radiation based measurements. More particularly, this disclosure relates to estimating one or more formation parameters of interest using information obtained from a formation exposed to a pulsed neutron source.

BACKGROUND OF THE DISCLOSURE

Oil well logging has been known for many years and provides an oil and gas well driller with information about the particular earth formation being drilled. In conventional oil well logging, during well drilling and/or after a well has been drilled, a radiation source and associated radiation detectors may be conveyed into the borehole and used to determine one or more parameters of interest of the formation. A rigid or non-rigid carrier is often used to convey the radiation source, often as part of a tool or set of tools, and the carrier may also provide communication channels for sending information up to the surface. The tool or set of tools may be configured to store information for later retrieval.

SUMMARY OF THE DISCLOSURE

In aspects, the present disclosure is related to methods of estimating a parameter of interest of an earth formation using radiation detected from a subterranean formation.

One embodiment according to the present disclosure may include a method for estimating at least one parameter of interest of an earth formation, comprising: estimating the at least one parameter of interest using a first component and a second component of an information set obtained using a single radiation detector.

Another embodiment according to the present disclosure may include an apparatus for estimating at least one parameter of interest of an earth formation, comprising: at least one processor; a storage device; and a program stored on the storage device comprising instructions that, when executed, cause the at least one processor to: estimate the at least one parameter of interest using a first component and a second component of an information set obtained using a single radiation detector.

Another embodiment according to the present disclosure may include a method for estimating at least one parameter of interest of an earth formation, comprising: estimating at least one parameter of interest using a time-dependent ratio based on information acquired from at least one neutron detector and a second detector.

Another embodiment according to the present disclosure may include a method for estimating at least one parameter of interest of an earth formation, comprising: estimating at least one parameter of interest using a time-dependent ratio based on information acquired from at least one neutron detector and a second detector; and combining reference information relating to the earth formation with the time-dependent ratio to estimate the at least one parameter of interest, wherein the at least one parameter of interest includes at least one of: porosity, sigma, diffusion correction, and hydrogen index.

Another embodiment according to the present disclosure may include an apparatus for estimating at least one parameter of interest of an earth formation, comprising: a processor; a storage subsystem; and a program stored by the storage subsystem comprising instructions that, when executed, cause the processor to: estimate a time-dependent ratio based on information acquired from at least one neutron detector and a second detector.

Another embodiment according to the present disclosure may include an apparatus for estimating at least one parameter of interest of an earth formation, comprising: a processor; a storage subsystem; and a program stored by the storage subsystem comprising instructions that, when executed, cause the processor to: estimate a time-dependent ratio based on information acquired from at least one neutron detector and a second detector; and combine reference information relating to the earth formation with the time-dependent ratio to estimate the at least one parameter of interest, wherein the at least one parameter of interest includes at least one of: porosity, sigma, diffusion correction, and hydrogen index.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

Figure 1:
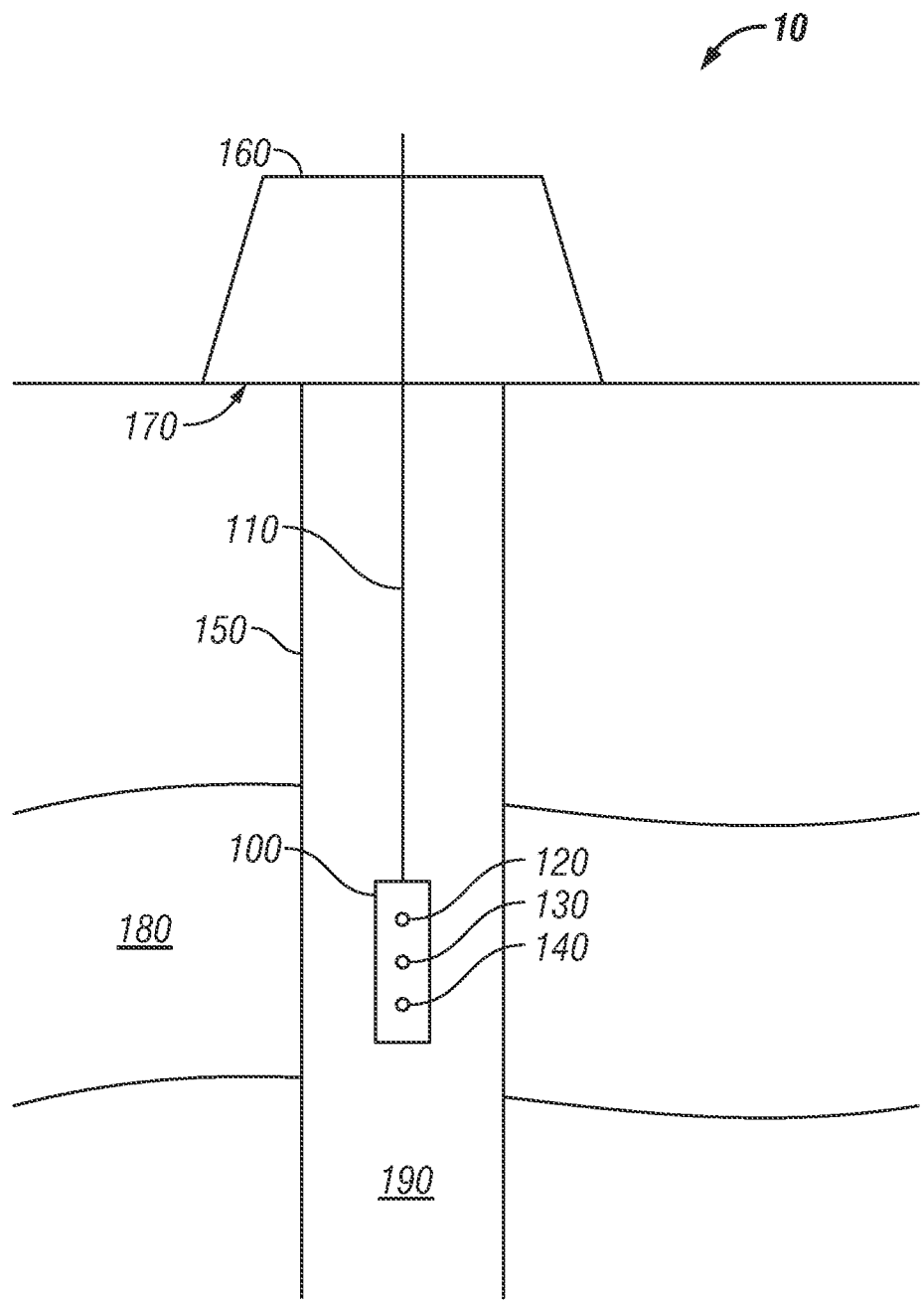
FIG. 1 shows a schematic of a downhole tool deployed in a wellbore along a wireline according to one embodiment of the present disclosure.

The present disclosure relates to estimating a parameter of interest of an earth formation using a radiation source, particularly nuclear radiation. The earth formation may be exposed to radiation, and more particularly a neutron source. Downhole tools may include a radiation source and one or more detectors. Herein, the radiation source may include, but is not limited to, one or more of: (i) a neutron source, (ii) a gamma-ray source, and (iii) an x-ray source. The detectors may be used to detect radiation from the earth formation, though the detectors are not limited to detecting radiation of the same type as emitted by the radiation source. Detectors may have shielding to prevent the counting of radiation from unintended sources.

During operation of the radiation source, radiation may be emitted from the source into the earth formation to be surveyed and interact with the nuclei of the atoms or atoms of the material of the earth formation resulting in various nuclear reactions and/or gamma ray reactions such as Compton scattering and pair-production.

The detectors may estimate the radiation count returning from the earth formation. If multiple detectors are used, the detectors may be spaced in a substantially linear fashion relative to the radiation source. If two detectors are used, there may be a short spaced (SS) detector and a long spaced (LS) detector, wherein the detectors have different distances from the radiation source. The SS and LS detectors are not limited to being placed on the same side of the radiation source as long as their spacing from the radiation source is different. Additional detectors may be used as long as their spacing differs from the spacing of the other detectors relative to the radiation source. One of the two detectors may be a neutron detector, while the other detector may be a neutron detector or another type of radiation detector, such as, but not limited to, a gamma-ray detector and an x-ray detector.

In one aspect, the radiation source may be controllable in that the radiation source may be turned "on" and "off" while in the wellbore, as opposed to a radiation source that is "on" continuously. Due to the intermittent nature of the radiation source, radiation from the source will reach differently spaced detectors at different times. When the radiation source transmits a signal, such as a pulse, the resulting response from the earth formation may arrive at the respective detectors at different times.

In some embodiments, a neutron detector may be used to acquire radiation information from a volume of interest in the earth formation. The neutron detector may detect neutrons and gamma rays emitted by the volume of interest. The radiation information may include a first component and a second component. The first component may be a neutron count, and the second component may be a non-neutron count. The first and second components may be detected simultaneously. An algorithm may be used to deconvolve the radiation information into the first component and the second component. The second component may be used to estimate a parameter of interest of the volume of interest. The second component may be used with the first component to provide two depths of investigation. Since the two components may be detected simultaneously using a single neutron detector, the radiation information may be collected over a short period of time, such as a single pulse cycle. Herein, a pulse cycle is defined as the period between the initiation of a first neutron pulse by a neutron source and a second pulse, thus the pulse cycle includes the neutron pulse period and its associated decay period. In one embodiment, the pulse cycle is about 1000 microseconds (60 microsecond pulse period and 940 microsecond decay period).

In some embodiments, porosity and SIGMA for a formation may be estimated for the same time period using a single measurement. In another embodiment, the second component may be a gamma count, and the gamma count may be used to estimate gamma driven SIGMA measurements for the volume of interest. Since the first component (neutron count) may be used to estimate neutron driven SIGMA measurements for the volume of interest, the use of both components may provide improved SIGMA estimation and reduction in SIGMA estimation errors. The use of simultaneous gamma driven and neutron driven SIGMA measurements may be beneficial since the effectiveness of the type of SIGMA measurement used may vary depending on the structure and composition of the earth formation. In the earth formation, even if both types of SIGMA measurement are effective, the different types of SIGMA measurements may have varying degrees of effectiveness at different depths (i.e. neutron driven SIGMA for short range, gamma driven SIGMA for long range).

FIG. 1 schematically illustrates a drilling system 10 having a downhole tool 100 containing a radiation source 140 and associated detectors 120, 130 according to one embodiment of the present disclosure. As shown, the system 10 may include a conventional derrick 160 erected on a derrick floor 170. A carrier 110, which may be rigid or non-rigid, may be configured to convey the downhole tool 100 into wellbore 150 in proximity to the earth formation 180. The carrier 110 may be a drill string, coiled tubing, a slickline, an e-line, a wireline, etc. Downhole tool 100 may be coupled or combined with additional tools.

Detector 130 may be a short spaced detector, and detector 120 may be a long spaced detector. Radiation shielding (not shown) may be located between radiation source 140 and the detectors 120, 130. Radiation shielding may include, but is not limited to, gamma-ray shielding and neutron shielding. Drilling fluid 190 may be present between the earth formation 180 and the downhole tool 100, such that emissions from radiation source 140 may pass through drilling fluid 190 to reach earth formation 180 and radiation induced in the formation 180 may pass through drilling fluid 190 to reach the detectors 120, 130.

In one embodiment, the downhole tool 100 may use a pulsed neutron generator emitting 14.2 MeV fast neutrons as its radiation source 140. The electronics (not shown) associated with the detectors may be capable of recording counts from at least two axially spaced detectors 120, 130 with very narrow time bins (or windows) and generating a time-dependent ratio between the at least two axially spaced detectors by using time-dependent information from multiple bursts.

Herein, "information" may include raw data, processed data, and signals. The ratio, R, may be typically calculated by dividing the count rates from one detector by the count rates from the second detector. This ratio may be expressed as a curve or other graphical function that describes a combination of multiple ratio values. In some embodiments, the parameter of interest may be estimated using a difference between the detector counts. Herein, the term time-dependent broadly describes the property of the ratio to vary with time, as opposed to a ratio that remains constant, such as with a continuous radiation source. In some embodiments, the time-dependent ratio may be weighted by a function of the time. For example, the function may be an exponential function having time variable. It is a general function of time that may take other forms as well. The axially spaced detector count rate ratios may be obtained as a function of time and graphically illustrated as a time-dependent ratio curve. Various properties of the earth formation may be determined using the time-dependent ratio curve, including, but not limited to, porosity, sigma, diffusion correction, and hydrogen index of the earth formation.

Figure 2:
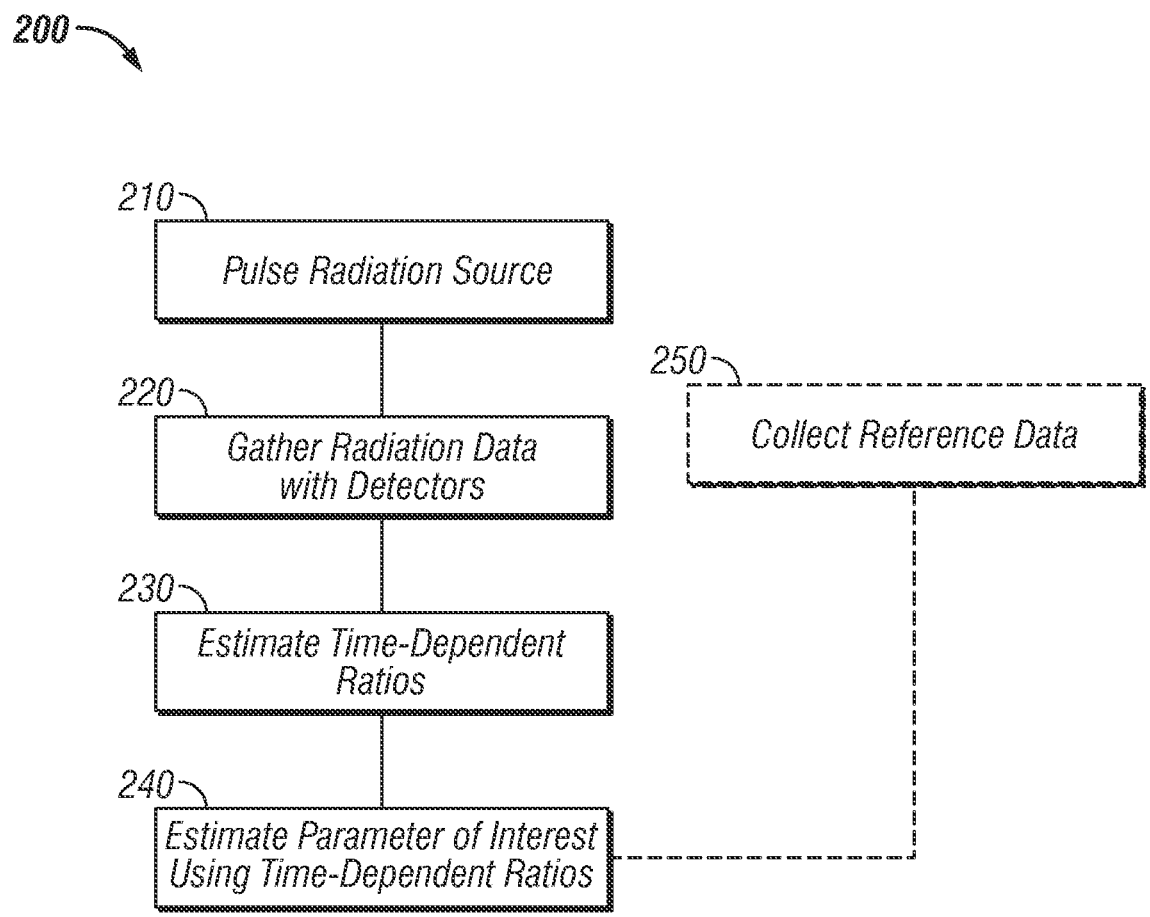
FIG. 2 shows a flow chart of an estimation method for one embodiment according to the present disclosure.

As shown in FIG. 2, method 200 is a method for estimating at least one parameter of interest using a time-dependent ratio based on information acquired from at least one neutron detector and a second detector according to the present disclosure. Method 200 may include step 210, where a radiation source emits a neutron pulse in proximity to an earth formation. In step 220, the resulting interactions between the neutron pulse and the material of the earth formation result in thermalized neutrons, which may be detected by short spaced detector 130 and long spaced detector 120. Herein, the neutron interactions may include, but are not limited to, elastic scattering, inelastic scattering and capture. In step 230, time-dependent ratios may be generated using the radiation information collected by the detectors. In the alternative, information collected by the detectors may be used to generate a difference between the radiation counts estimated by the detectors. In step 240, a parameter of interest of the earth formation may be estimated using the time-dependent ratios. The estimation of the parameter of interest may also include comparison or combination of the time-dependent ratios with reference information about the earth formation. In some embodiments, estimation method 200 may include step 250, where reference information on the earth formation or earth formations generally is collected. Reference information may be combined with time-dependent ratios in step 240 to estimate a parameter of interest.

Figure 3:
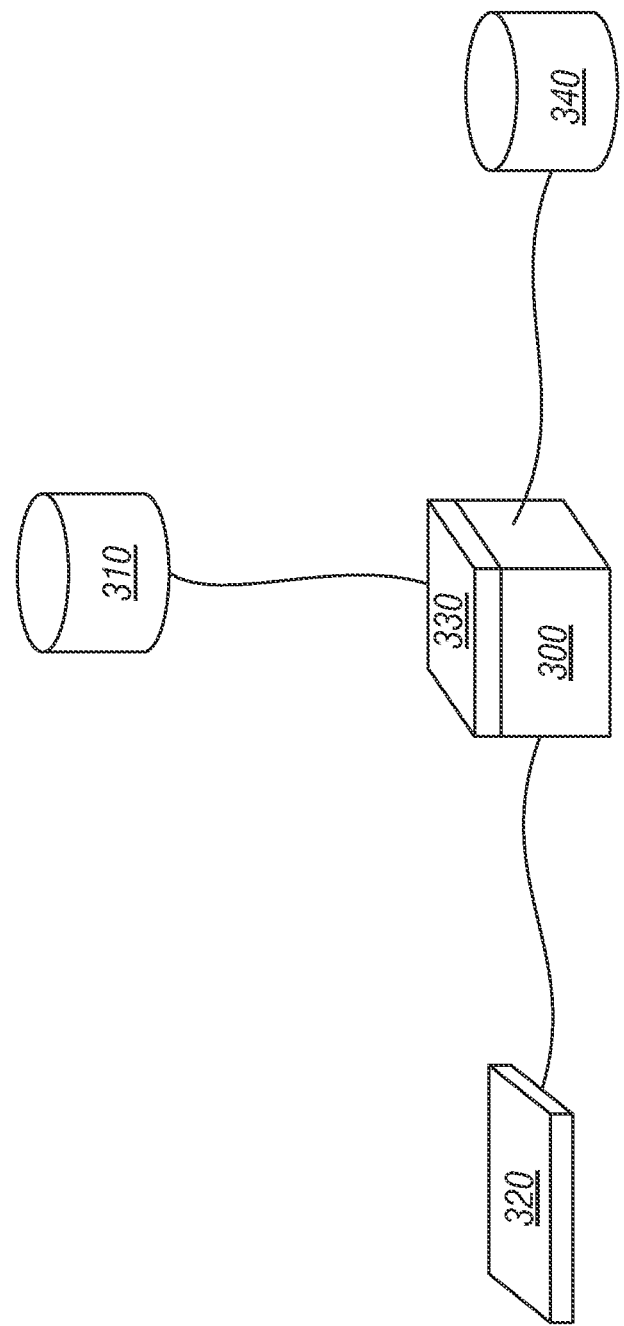
FIG. 3 shows schematic of the apparatus for implementing one embodiment of the method according to the present disclosure.

As shown in FIG. 3, certain embodiments of the present disclosure may be implemented with a hardware environment that includes an information processor 300, an information storage device 310, an input device 320, processor memory 330, and may include peripheral information storage medium 340. The input device 320 may be any information reader or user input device, such as data card reader, keyboard, USB port, etc. The information storage device 310 stores information provided by the detectors. Information storage device 310 may be any non-transitory machine-readable information storage medium, such as a USB drive, memory stick, hard disk, removable RAM, EPROMs, EAROMs, flash memories and optical disks or other commonly used memory storage system known to one of ordinary skill in the art including Internet-based storage. Information storage medium 310 stores a program that when executed causes information processor 300 to execute the disclosed method. Information storage medium 310 may also store the earth formation information provided by the user, or the earth formation information may be stored in a peripheral information storage medium 340, which may be any standard computer information storage device, such as a USB drive, memory stick, hard disk, removable RAM, or other commonly used memory storage system known to one of ordinary skill in the art including Internet based storage. Information processor 300 may be any form of computer or mathematical processing hardware, including Internet-based hardware. When the program is loaded from information storage medium 310 into processor memory 330 (e.g. computer RAM), the program, when executed, causes information processor 300 to retrieve detector information from either information storage medium 310 or peripheral information storage medium 340 and process the information to estimate a parameter of interest. Information processor 300 may be located on the surface or downhole.

Figure 4:
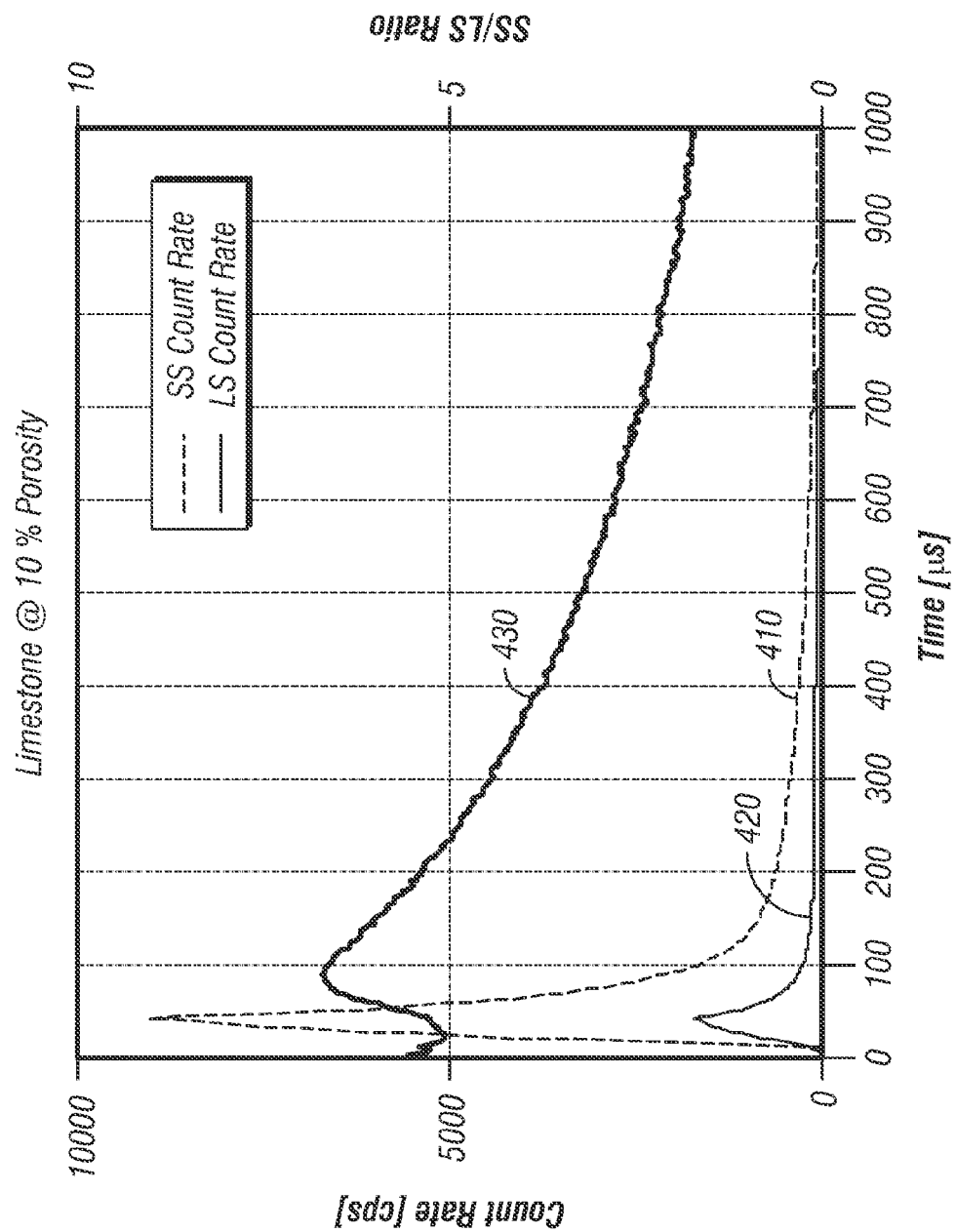
FIG. 4 shows a graphical illustration of the detector count rates and ratio over time according to one embodiment according to the present disclosure.

In one embodiment, the detectors 120, 130 predominantly count thermal neutrons released by the earth formation after exposure to a 40 μsec pulse. The use of a 40 μsec pulse duration is illustrative and exemplary only, as different pulse durations may be used. Typically, the pulse will be "on" for a substantially shorter period than the pulse will be "off". When the pulse is "off," the radiation counts start to decay very rapidly and soon reach an asymptotic decay rate. As shown in as shown in FIG. 4, the short spaced detector radiation count 410 and the long spaced detector radiation count 420 do not decay at the same rates. This difference in decay rates results in short spaced/long spaced ratio 430. If the decay rates were the same, the ratio 430 would have been constant through the period. As shown in FIG. 4, the ratio varies significantly through the period.

In step 210, when a volume of interest in an earth formation is exposed to a neutron pulse, the neutrons in the volume of interest may be removed by two primary mechanisms. The first one is neutron capture interactions. The second one is escape of thermal neutrons from the volume of interest. This may be termed a diffusion effect that is describing diffusion of neutrons from high neutron flux to low neutron flux areas. The neutron current term used in the neutron diffusion theory can be used to provide insight into this mechanism. For a one-dimensional case in a Cartesian coordinate system, the net current term through an interface normal to x-direction is given as $$J = -D \frac{d\phi}{dx} \quad (1)$$

In this case, D represents the diffusion coefficient of the material and $$\frac{d\phi}{dx}$$

represents the spatial gradient of the neutron flux. The diffusion coefficient may be estimated by total and scattering cross sections. In this case, these are the thermal energy range total and scattering cross sections. The following equation gives the expression for calculating diffusion coefficient.

$$D = \frac{1}{3\left(\sum_t - \bar{\mu}_0 \sum_s\right)} \quad (2)$$

Figure 5:
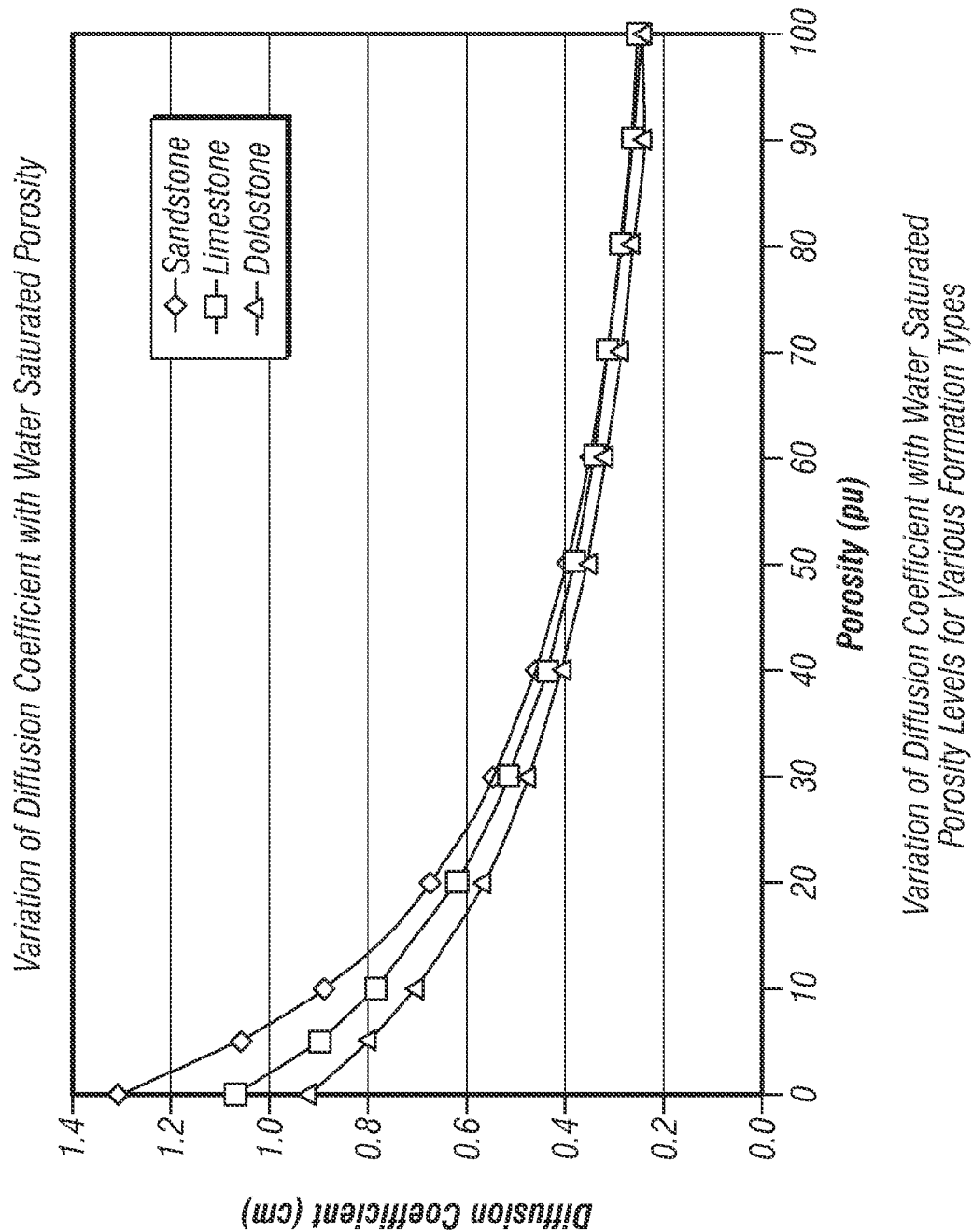
FIG. 5 shows a graphical illustration of the variation of the diffusion coefficient between earth formation types using one embodiment according to the present disclosure.
Figure 6:
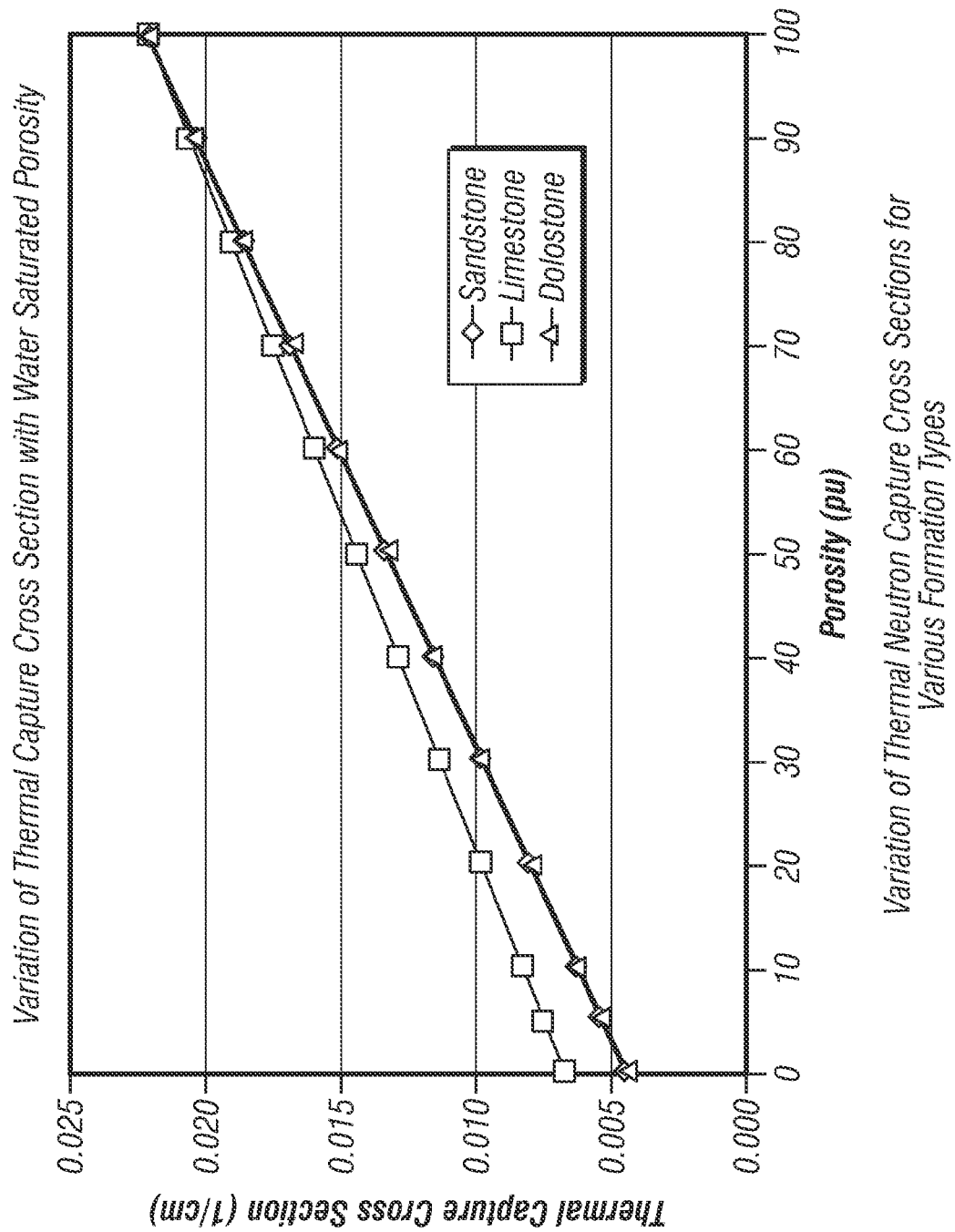
FIG. 6 shows a graphical illustration of the variation of thermal neutron capture cross sections between earth formation types using one embodiment according to the present disclosure.
Figure 7:
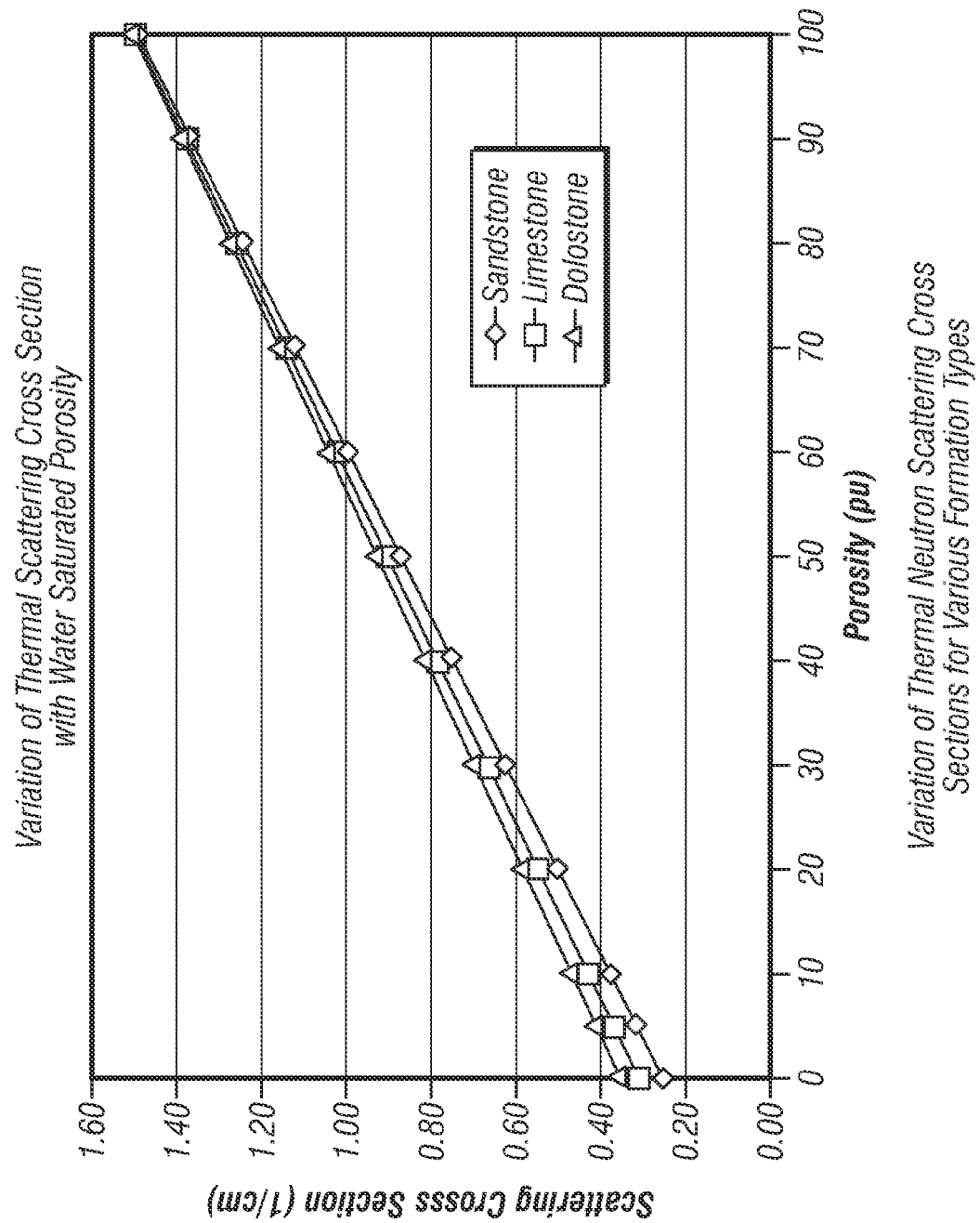
FIG. 7 shows a graphical illustration of the variation of thermal neutron scattering cross sections between earth formation types using one embodiment according to the present disclosure.

In this equation, $\Sigma_t$, $\Sigma_s$ and $\bar{\mu}_0$ may represent the total and scattering cross sections and average scattering angle cosine. As the expression implies, the diffusion coefficient is a material property because the total and scattering cross sections are material properties and they vary with the material composition. In FIG. 5, the diffusion coefficients of three earth formation types are plotted as a function of porosity. The porosity is saturated with fresh water. The capture and scattering cross sections driving the change in the diffusion coefficients are shown in FIGS. 6 & 7.

As the equation (1) shows, net current uses a product of the diffusion coefficient and the neutron flux gradient. Hence, the diffusion is determined by not only the material properties but also by the neutron flux gradient as well. In step 220, detectors 120, 130 count the radiation coming from the earth formation. For cases where the diffusion coefficient is fixed, for the sake of simplicity, the larger difference between the short and the long spaced detector count rates may result in larger current values.

In step 230, time-dependent ratios may be estimated for the counts collected by the detectors. Since the diffusion of neutrons from high flux volumes to low flux volumes varies the neutron gradient, the net current term may change with time as a result of the variation in the spatial gradient. Since time variation of the counts is of interest, the ratio will change with time as well. In other words, the neutrons will diffuse from high flux areas to low flux areas and spatial gradient will decrease resulting in the reduction in the net current term with the time. As a result of this, a ratio of short spaced to long spaced detector count rates will approach an asymptotic value. Regardless, the overall process will manifest itself as a variation in the short-to-long detector ratio in time.

If more than two detectors are used, multiple ratios may be taken for determining additional parameters. Depending on how the ratios are processed, multiple parameters may be determined from the same multidimensional information. In step 240, the time-dependent ratios may be used to estimate a parameter of interest. Illustrations of uses for the time-dependent ratios to determine some parameters of interest are detailed below.

Hydrogen Index Determination

Figure 8:
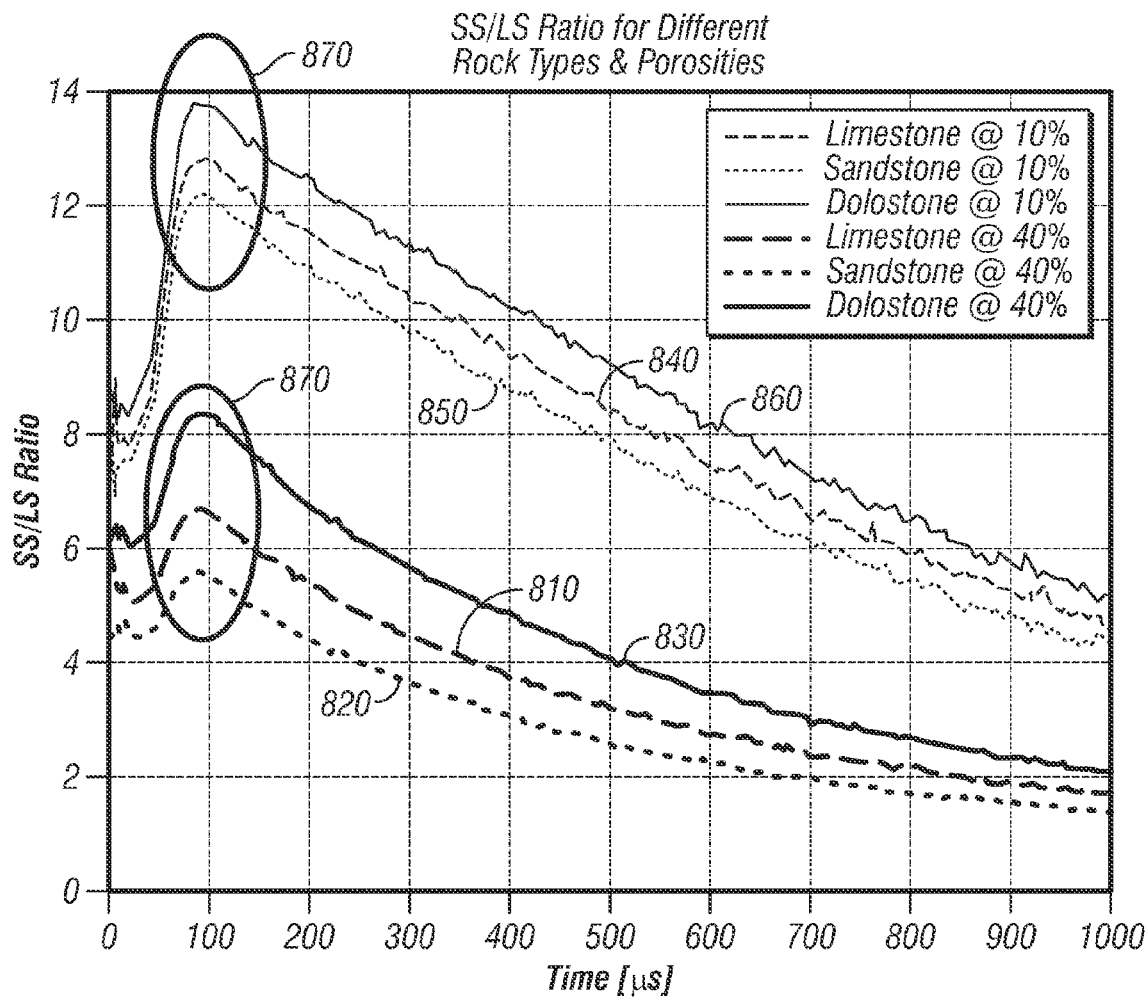
FIG. 8 shows a graphical illustration of the variation of short-to-long space detector count ratios over time using one embodiment according to the present disclosure.
Figure 9:
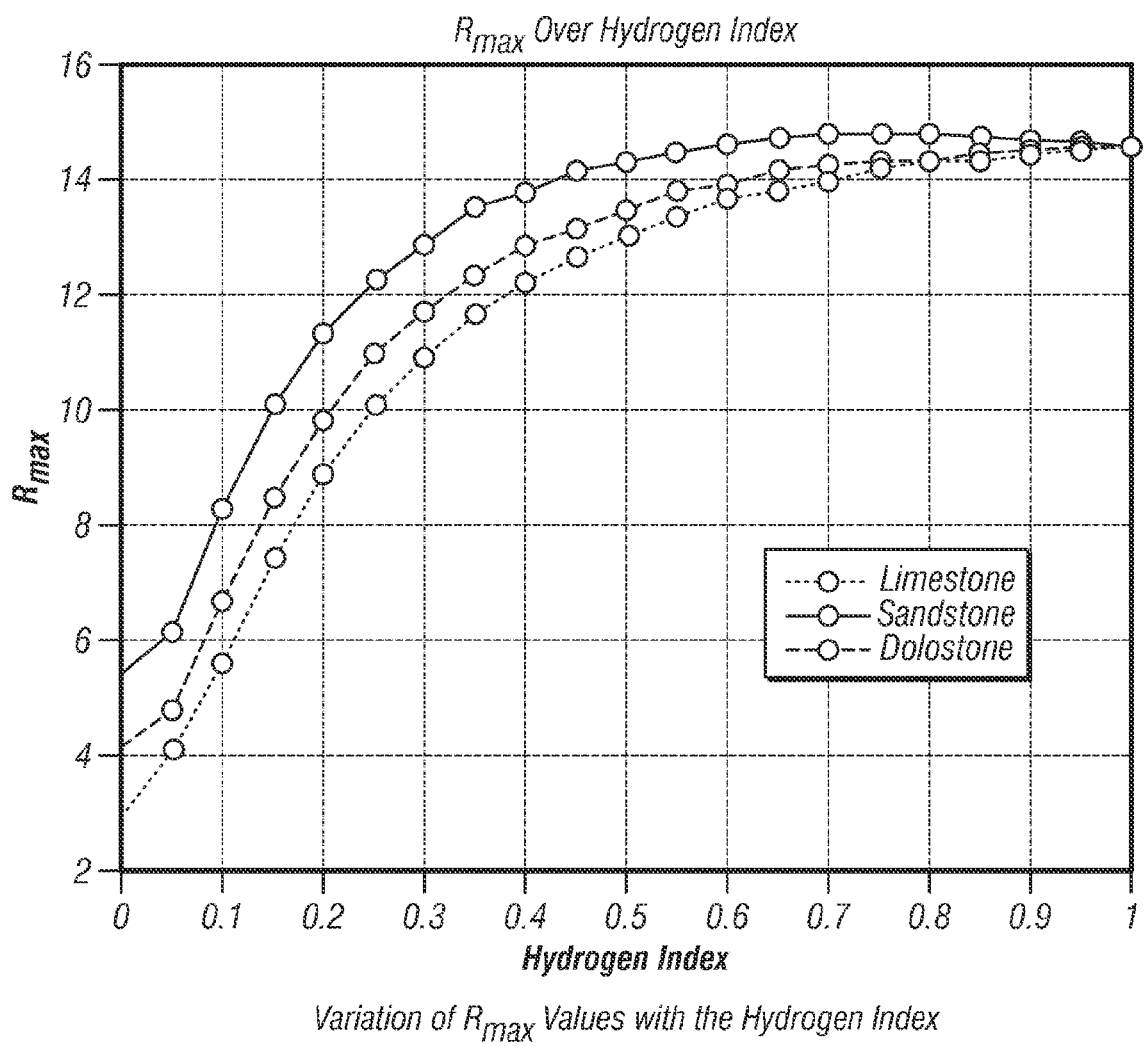
FIG. 9 shows a graphical illustration of the variation of $R_{max}$ values with the hydrogen index using one embodiment according to the present disclosure.

An issue of interest with the variation of ratios is the impact of the earth formation type, porosity and formation fluids on the magnitude and decay rates of the ratios. FIG. 8 shows ratios for various earth formation types with varying levels of porosity saturated with water. The solid line curves are for 10 pu formations of limestone 810, sandstone 820, and dolostone 830. The broken line curves are for 40 pu formations of limestone 840, sandstone 850, and dolostone 860. A 40 pu formation will have a higher hydrogen atom density present in the earth formation than a 10 pu formation. The maximum ratio values, $R_{max}$ 870, observed will follow the hydrogen density in the earth formation. The reason for this is the increase in the absolute hydrogen atom density in the earth formation dominantly increases the thermalization rate and thus creates a larger spatial gradient between the short and long spaced detectors. Therefore, $R_{max}$ 870 may be related back to the amount of hydrogen present in the earth formation. If formation porosity is filled with water, oil or gas, then these substances will correlate to hydrogenous fluid filled porosity. FIG. 8 shows the $R_{max}$ 870 values plotted against the porosity for the three earth formation types 810, 820, and 830. When the porosity level is high, the ratios are higher in general. The earth formation properties may impact the time-dependent ratios, however, their effects may be small relative to the hydrogenous fluid filled porosity. The earth formation type impact can be observed by comparing, $R_{max}$ values for sandstone, limestone and dolostone 870. Variation of $R_{max}$ with hydrogen index and earth formation type can be seen in FIG. 9.

Sigma Determination

The sigma of the earth formation may be estimated using the time variation of the count rates obtained through a single detector. In some cases, sigma may be estimated using gamma counts induced by neutrons, however, this example is illustrative and exemplary, as other counts, such as, neutron counts may be used as well. A set of time-dependent ratio may be used to estimate the value of sigma. The ratio of the short spaced and long spaced detector count rate or absolute or relative differences of count rates may be used to estimate sigma. The window size and position are apparatus dependent and are primarily optimized based upon minimizing measurement uncertainty, background noise, and external effects on the measurement of the parameter of interest. The window averaged ratio $\bar{R}$ may be computed by averaging the R values over the selected time window. The time window and width may be chosen either with a static or a dynamic width. The location of the window on the time scale may be moved to capture the best position to be able to measure the most accurate sigma value with lowest uncertainty possible. Various statistical approaches can be used to determine the proper location and width of the windows selected to compute $\bar{R}$. $\bar{R}$ value computed through the selected approach is then compared to a calibration curve to extract the sigma for the measurement.

Diffusion Correction

Diffusion correction allows for correction of the detector counts due to errors caused by neutron leakage from the volume of interest. Diffusion is driven by not only the material properties but by the spatial gradient of the neutron flux as well. In some embodiments, correction measurement may take into account both material properties and the spatial gradient of neutron flux. This may be achieved by using multiple correlations. While $R_{max}$ accounts for the neutron flux spatial gradient for the earth formation, the slope of R, R', provides the second parameter needed for the second contribution. R' can be determined by using either preset and pre-sized time windows or at a chosen point in the time scale. Once the $R_{max}$ is determined from log information, corresponding correlation is used with R' to determine the amount of the correction to be applied to the sigma. R' may be defined by standard calculus as $$R' = \lim_{\Delta t \to 0} \frac{R_1 - R_2}{t_1 - t_2} \approx \frac{\Delta R}{\Delta t} \tag{3}$$

Porosity Determination

Figure 10:
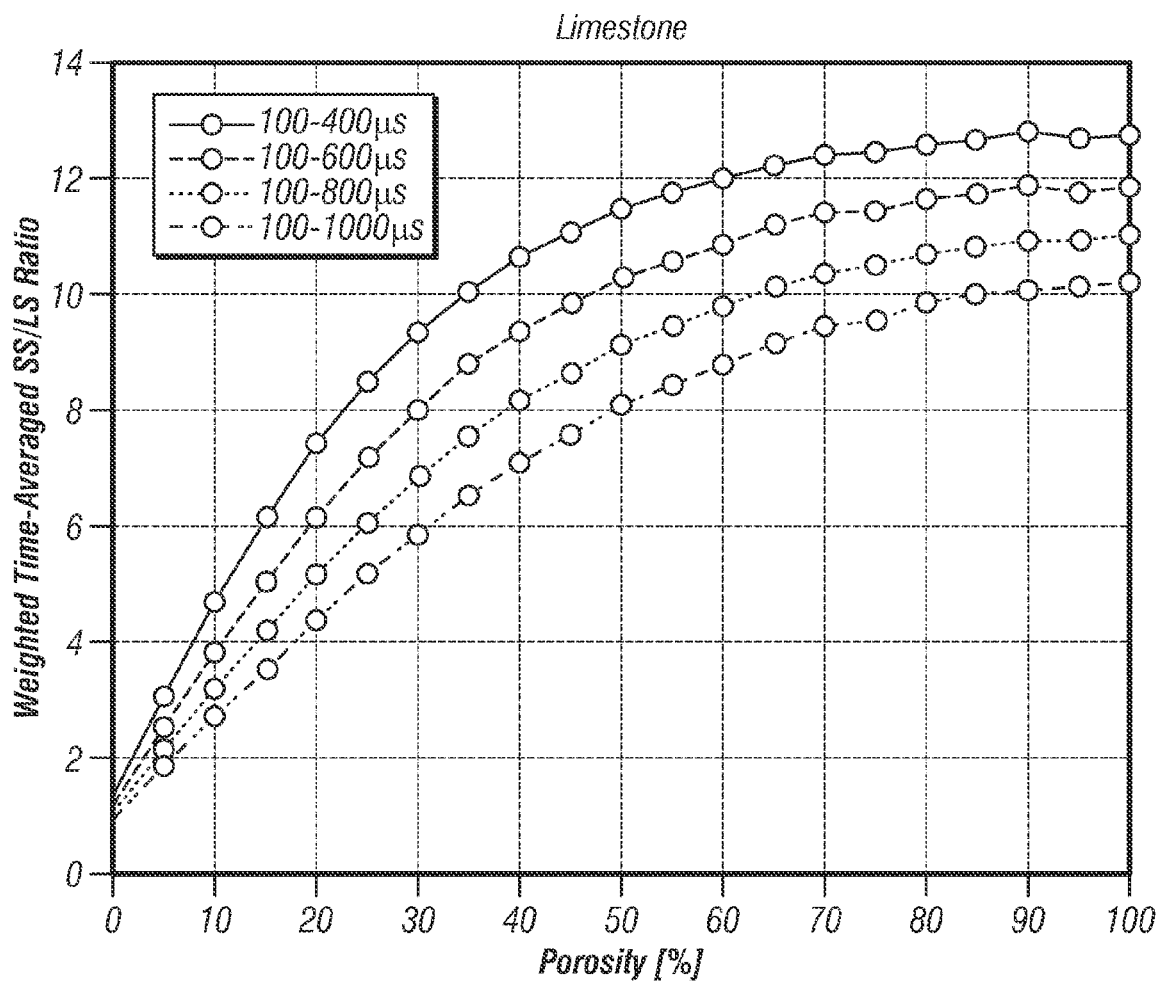
FIG. 10 shows a graphical illustration of the weighted time-averaged ratios as a function of porosity using one embodiment according to the present disclosure.

The magnitude of the ratio may be heavily affected by the porosity because the pore volume contains hydrogen, oxygen and carbon and some other atoms. The variation of R will be different as well. Time weighted values of R, $\bar{R}_t$, may be used to obtain the porosity values from the measurements. As with the previous estimates, the window size and location may be adjusted dynamically or statically. Statistical methods can be used to determine window location and window width. One example of such a porosity determination is shown in FIG. 10, where four window sizes have been used to obtain $\bar{R}_t$. The weighting scheme includes weighting the R values directly by time values. Other time, weighting algorithms may be used to emphasize on different features of the R values, without limit.

Figure 11:
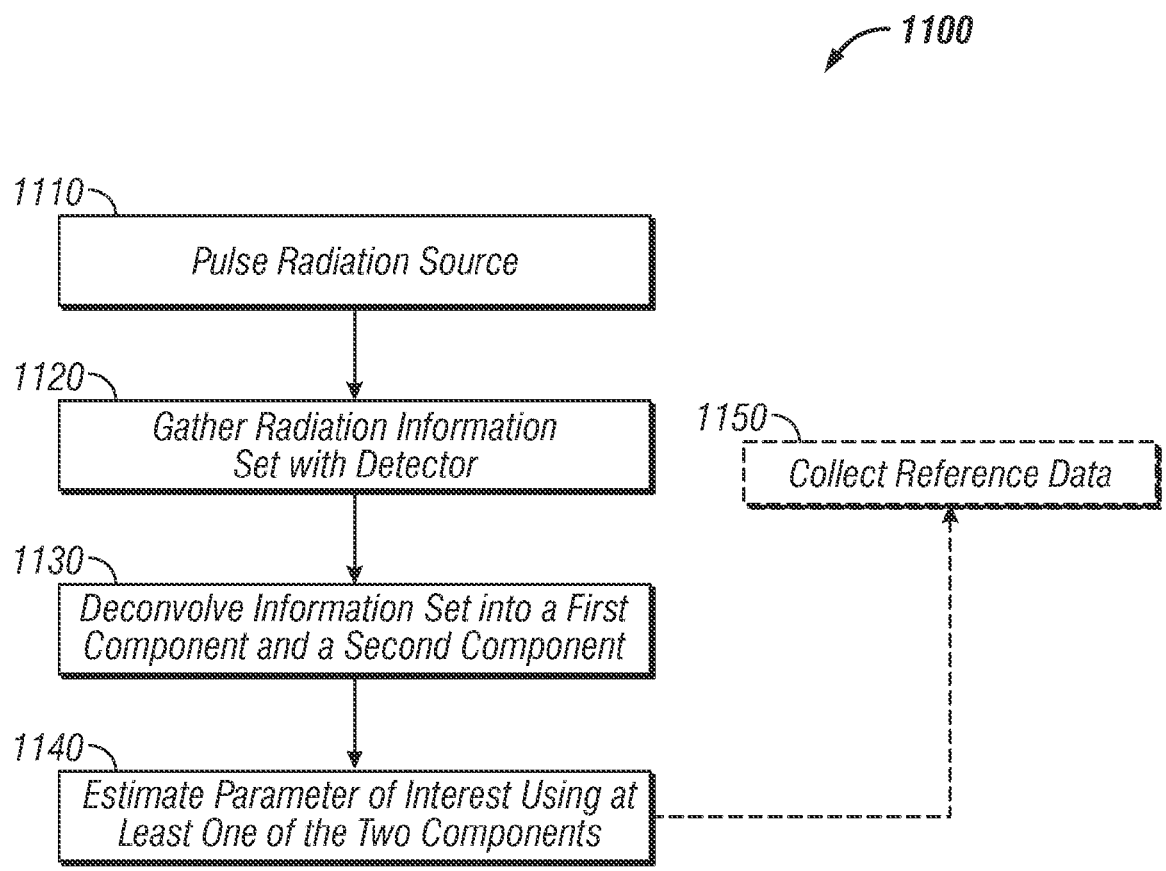
FIG. 11 shows a flow chart of another estimation method for one embodiment according to the present disclosure.

FIG. 11 shows one embodiment of a method 1100 for estimating at least one parameter of interest of an earth formation using a first component and a second component of an information set obtained using a single radiation detector according to the present disclosure. Method 1100 may include step 1110, where a radiation source emits a neutron pulse in proximity to an earth formation. In step 1120, the resulting interactions between the emitted neutrons and the material in a volume of interest of the earth formation results in the release of secondary radiation, which may be detected by a detector 120, 130. The radiation may include, but is not limited to, one or more of: thermalized neutrons and gamma rays. In some embodiments, a single detector 120, 130 may be used to detect the radiation. In some embodiments, the information set may be obtained during a single pulse cycle. In step 1130, an information set representing the radiation received by the detector may be deconvolved to separate the information set into a first component and a second component. In step 1140, a parameter of interest of the formation may be estimated using, alone or in combination, one or more of the first component and the second component. The first component may include a particle count and the second component may include an electromagnetic radiation count. The first component may include a neutron count and the second component may include a non-neutron count, such as a gamma ray count. In some embodiments, the first component may include information about a first depth of investigation and the second component may include information about a second depth of investigation. The estimation of the parameter of interest may also include comparison or combination of one or more of the components with reference information about the earth formation. In some embodiments, estimation method 1100 may include step 1150, where reference information on the earth formation or earth formations generally is collected.

In step 1130, the information set may be deconvolved using techniques known to those of skill in the art with the benefit of the present disclosure. In one exemplary technique, the information set, which may be expressed as N(x), may be divided by energy level into three segments: (i) a first segment that may include radiation counts at energy levels below a neutron energy range, (ii) a second segment that may include radiation counts at energy levels in the neutron energy range, and (iii) a third segment that may include radiation counts at energy levels above the neutron energy range. A new energy spectrum may be formed by combining the first segment and the third segment.

Next, the new energy spectrum (the second component) may be modeled by a function using the formula:

$$N_\gamma(x) = ax^b \quad (4)$$

where $N_\gamma(x)$ is a gamma count, x is the energy level, and a and b are constants that may be estimated using regression.

The first component may be estimated by subtracting the second component from the information set, as seen in the formula:

$$N_n(x) = N(x) - N_\gamma(x) \quad (5)$$

where $N_n(x)$ may be a neutron count.

The total neutron and gamma counts may be obtained using the formulas:

$$N_n = \int_{x_{min}}^{x_{max}} N_n(x) \, dx \quad (6)$$

$$N_\gamma = \int_{x_{min}}^{x_{max}} N_\gamma(x) \, dx \quad (7)$$

where $x_{max}$ and $x_{min}$ may be integration bounds for the energy spectrum.

Figure 12:
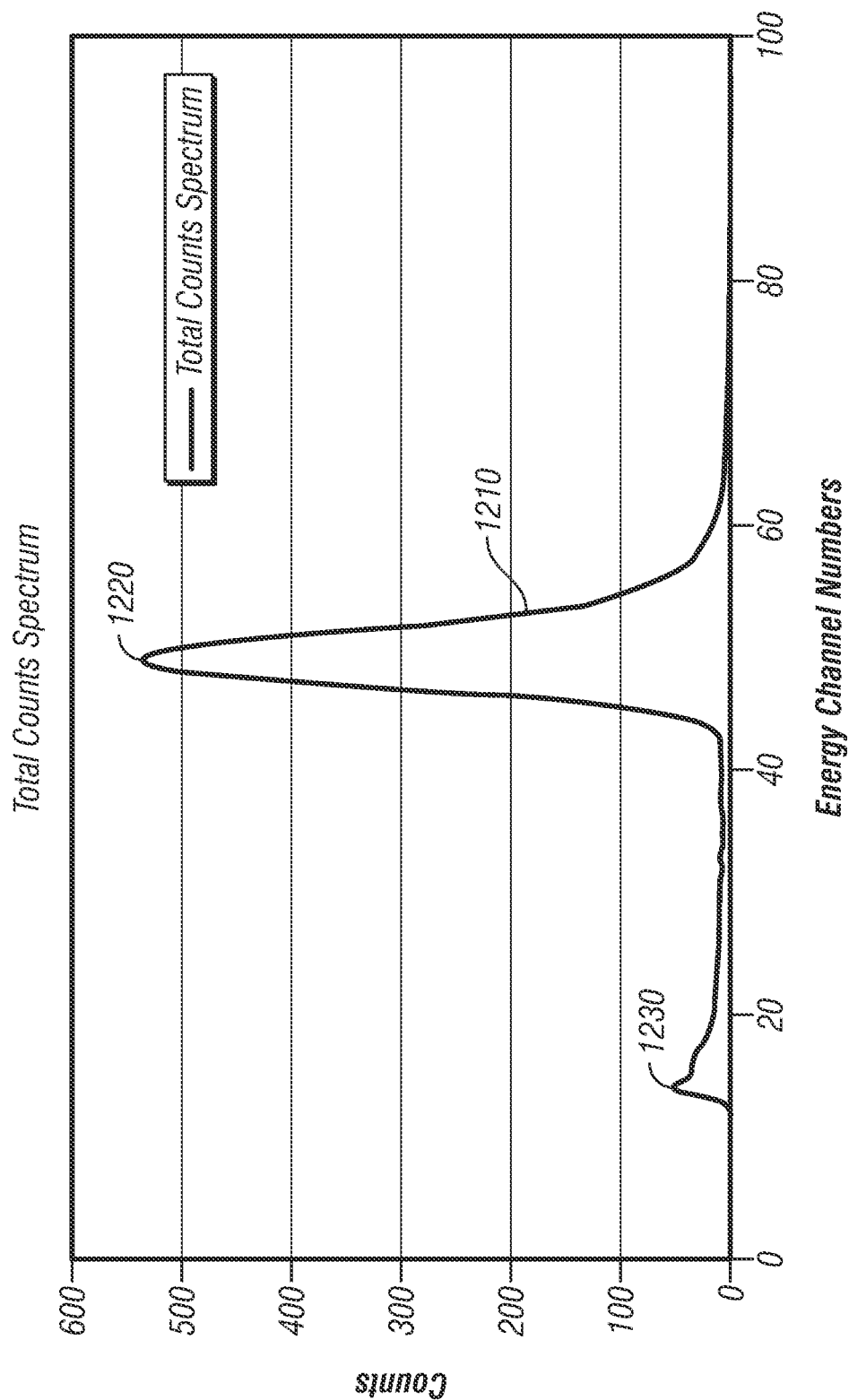
FIG. 12 shows a graphical illustration of an energy spectrum captured with two components using one embodiment according to the present disclosure.

FIG. 12 shows a typical energy spectrum recorded by a Li-6 neutron detector over a time interval after a volume of interest has been exposed to a neutron pulse. The energy spectrum 1210 may have a peak 1220 due mainly to neutrons and a continuum 1230 due mainly to a gamma rays. The use of a Li-6 neutron detector is exemplary and illustrative only, as other neutron detectors known to those of skill in the art with the benefit of this disclosure may be used.

Figure 13A:
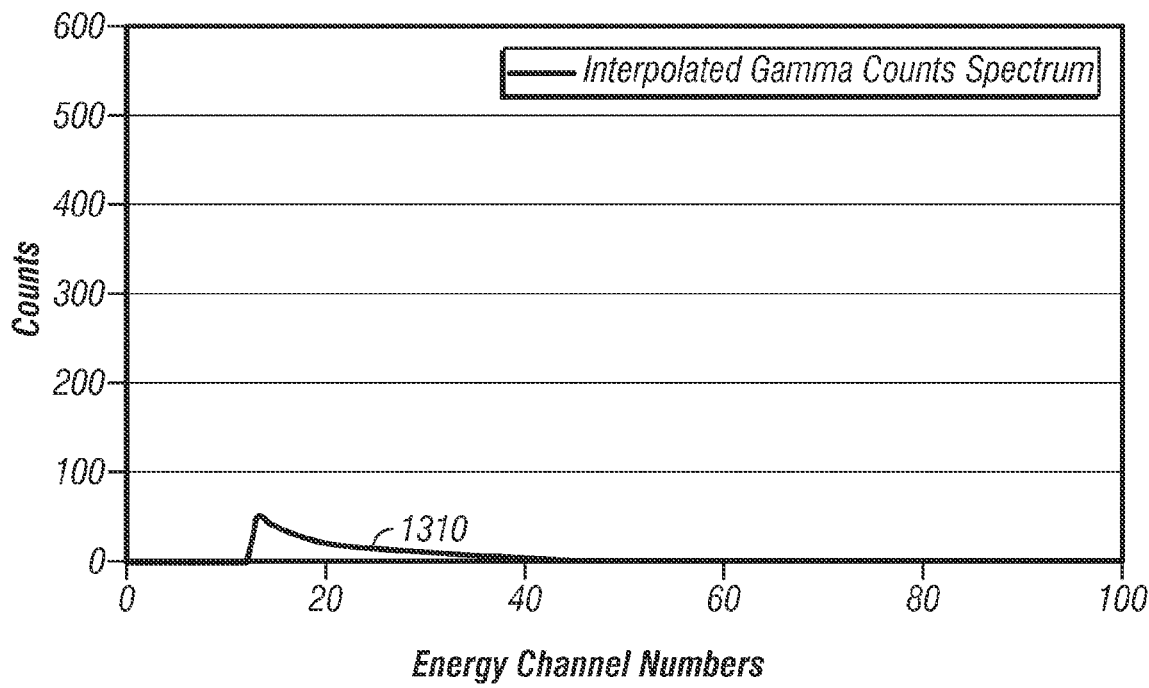
FIG. 13A shows a graphical illustration the first of two radiation information components after deconvolution using one embodiment according to the present disclosure.
Figure 13B:
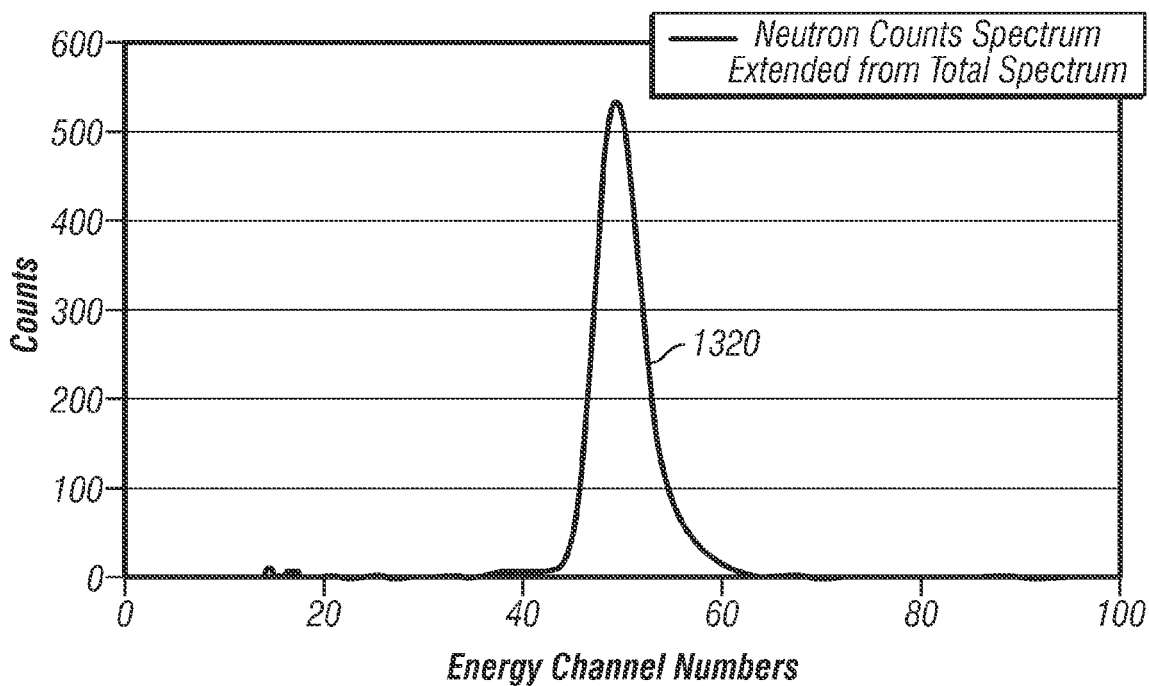
FIG. 13B shows a graphical illustration of the second of two radiation information components after deconvolution using one embodiment according to the present disclosure.

FIGS. 13A & 13B show the energy spectrum of FIG. 12 after deconvolution into a first component and a second component. FIG. 13A shows the second component 1310, which may be a non-neutron component. In this example, the second component is a gamma ray count. FIG. 13B shows the first component 1320, which may be a neutron component.

Figure 14:
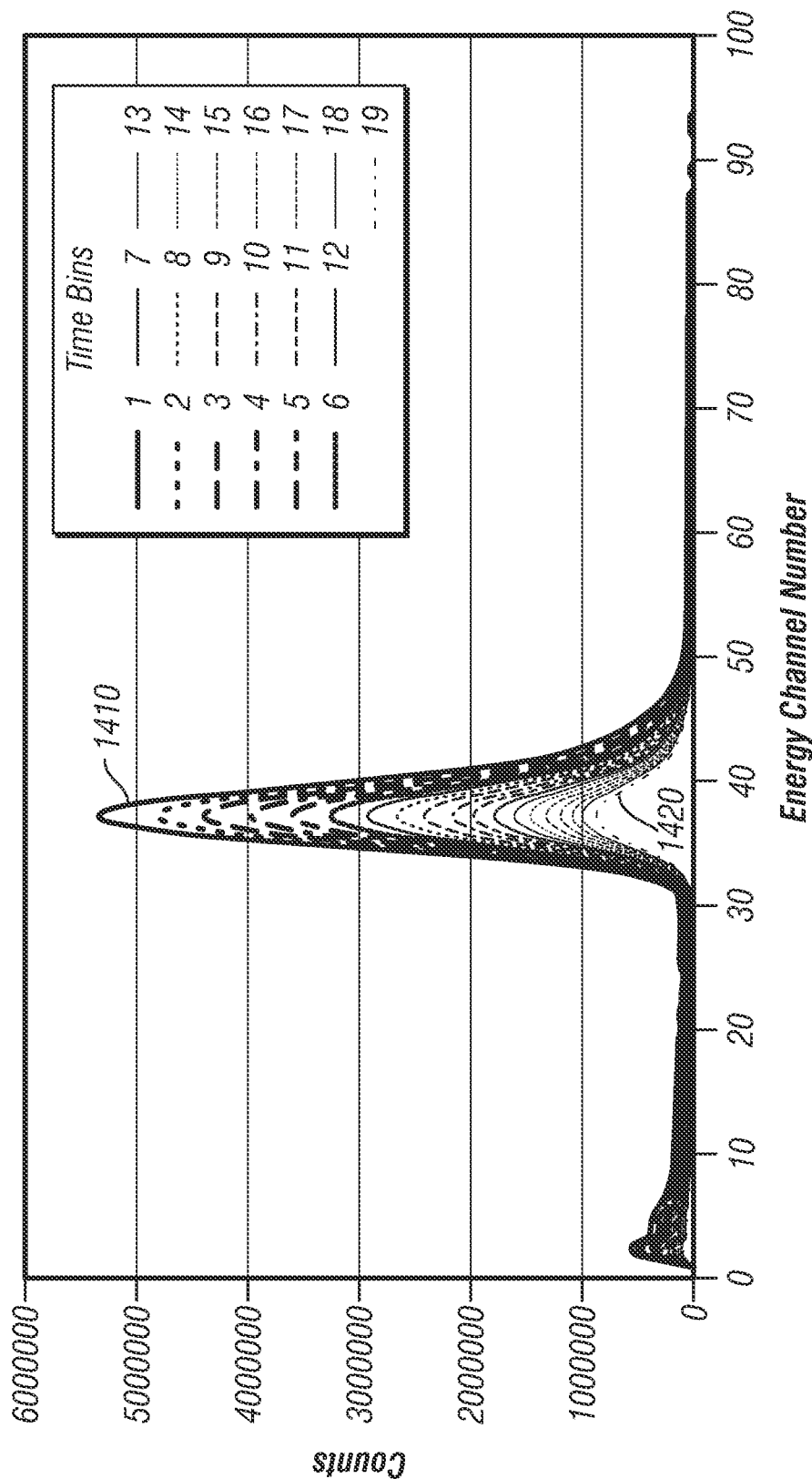
FIG. 14 shows a graphical illustration of an aggregation of energy spectra from the same pulse cycle across a series of time intervals using one embodiment according to the present disclosure.

FIG. 14 shows a series of energy spectra captured over several time intervals. In this example, each time interval (also known as a time bin) is about 10 microseconds in duration. Including a curve 1410 representing a time interval (0-10 microseconds after the end of the neutron pulse) and curve 1420 representing another time interval (180-190 microseconds after the end of the neutron pulse), there are 19 curves representing 19 time intervals.

While the foregoing disclosure is directed to the one mode embodiments of the disclosure, various modifications will be apparent to those skilled in the art. It is intended that all variations be embraced by the foregoing disclosure.

We claim:

1. A method for estimating at least one parameter of interest of a material in a volume of interest, comprising:
using a processor for estimating at least one parameter of interest using a slope of a time-dependent ratio curve at at least one point, the time-dependent ratio curve based on information acquired from at least one neutron detector and a second detector, wherein the information relates to neutrons and wherein a portion of the information is acquired before a thermalization period associated with the neutrons.

2. The method of claim 1, wherein the time-dependent ratio is weighted.

3. The method of claim 1, further comprising:
combining reference information relating to the earth formation with the time-dependent ratio to estimate the at least one parameter of interest.

4. The method of claim 1, wherein the at least one parameter of interest includes at least one of: porosity, sigma, diffusion correction, and hydrogen index.

5. The method of claim 1, wherein the time-dependent ratio is based on counts from the at least one neutron detector and the second detector.

6. The method of claim 1, wherein the second detector is a neutron detector.

7. The method of claim 1, wherein the volume of interest is in an earth formation.

8. The method of claim 1, wherein another portion of the information is acquired during a thermalization period associated with the neutrons.

9. The method of claim 1, wherein the ratio curve includes an asymptote indicative of a variation in spatial gradient of neutron flux associated with the neutrons.

10. An apparatus for estimating at least one parameter of interest of a material in a volume of interest, comprising:
a processor;
a storage device; and
a program stored by the storage device comprising instructions that, when executed, cause the processor to:
estimate a slope of a time-dependent ratio curve at at least one point, the time-dependent ratio curve based on information acquired from at least one neutron detector and a second detector, wherein the information relates to neutrons and wherein a portion of the information is acquired before a thermalization period associated with the neutrons.

11. The apparatus of claim 10, wherein the time-dependent ratio is weighted.

12. The apparatus of claim 10, wherein the program further comprises instructions that, when executed, cause the processor to:
combine reference information relating to the earth formation with the time-dependent ratio to estimate the at least one parameter of interest.

13. The apparatus of claim 10, wherein the at least one parameter of interest includes at least one of: porosity, sigma, diffusion correction, and hydrogen index.

14. The apparatus of claim 10, wherein the time-dependent ratio is a ratio of counts acquired from the at least one neutron detector and the second detector.

15. The apparatus of claim 10, wherein the second detector is a neutron detector.

16. The apparatus of claim 10, wherein the volume of interest is in an earth formation.

17. The apparatus of claim 10, wherein another portion of the information is acquired during a thermalization period associated with the neutrons.

18. A method for estimating at least one parameter of interest of a material in a volume of interest, comprising:
using a processor for estimating at least one parameter of interest using a time-dependent ratio curve based on information acquired from at least one neutron detector and a second detector, wherein the information relates to neutrons and wherein a portion of the information is acquired before a thermalization period associated with the neutrons;
wherein the ratio curve includes an asymptote indicative of a variation in spatial gradient of neutron flux associated with the neutrons.

* * * * *